United States Patent
Tanuma et al.

[11] Patent Number: 5,973,709
[45] Date of Patent: Oct. 26, 1999

[54] PRINTER AND PROCESS FOR PRINTING DIFFERENT SIZE DOTS BY SETTING DRIVE ENERGIES BASED ON ADJACENT DATA BIT LOGIC

[75] Inventors: Jiro Tanuma; Norio Nakajima; Shinichi Katakura, all of Tokyo, Japan

[73] Assignee: Oki Electric Industry Co., Ltd., Tokyo, Japan

[21] Appl. No.: 08/662,564

[22] Filed: Jun. 13, 1996

Related U.S. Application Data

[63] Continuation-in-part of application No. 08/078,910, Jun. 17, 1993, abandoned.

[30]   Foreign Application Priority Data

Jun. 24, 1992  [JP]  Japan .................................. 4-166415
Dec. 3, 1992   [JP]  Japan .................................. 4-324265

[51] Int. Cl.$^6$ ........................... B41J 2/385; B41J 2/435; B41J 2/47; H04N 1/23
[52] U.S. Cl. ......................... 347/131; 347/132; 347/237; 347/240; 358/298
[58] Field of Search ................................. 347/240, 237, 347/238, 130, 131, 132, 183, 211, 247, 252; 358/298

[56]   References Cited

U.S. PATENT DOCUMENTS

| | | | |
|---|---|---|---|
| 4,602,285 | 7/1986 | Beaulier et al. | 348/580 |
| 4,780,730 | 10/1988 | Dodge et al. | 346/139 R X |
| 4,819,008 | 4/1989 | Nagato et al. | 358/298 X |
| 5,134,495 | 7/1992 | Frazier et al. | |
| 5,146,236 | 9/1992 | Hirata et al. | 347/15 X |
| 5,155,499 | 10/1992 | Goetz et al. | 347/41 X |
| 5,193,008 | 3/1993 | Frazier et al. | |
| 5,357,273 | 10/1994 | Curry et al. | 358/298 X |
| 5,386,302 | 1/1995 | Kashikara et al. | 358/448 |
| 5,517,328 | 5/1996 | Wilson | 347/238 X |

FOREIGN PATENT DOCUMENTS

| | | |
|---|---|---|
| 0 006 351 | 1/1980 | European Pat. Off. . |
| 0 141 880 | 5/1985 | European Pat. Off. . |
| 2 215 553 | 9/1989 | United Kingdom . |

OTHER PUBLICATIONS

Mono, M. Morris, *Digital Design*, Prentice–Hall, Inc., Englewood Cliffs, New Jersey, 1984, pp. 119–121.

*Primary Examiner*—David F. Yockey
*Attorney, Agent, or Firm*—Panitch Schwarze Jacobs & Nadel, P.C.

[57]   ABSTRACT

An LED printer includes a printing control unit and an LED head. When a video signal received at the control unit has a higher resolution than the LED head, the control unit carries out the logical AND between successive bit data of the video signal to convert the video signal to a first signal. Corresponding to a line timing signal, this first signal is transferred as a head data signal to the LED head and is then printed on a basic raster scanning line. Further, the control unit also carries out the exclusive-OR between the successive bit data of the video signal so that the video signal is converted to a second signal and outputted to a line buffer. Corresponding to an additional line timing signal, the second signal is transferred as another head data signal to the LED head and is printed on an additional raster scanning line. The LED head drive energy for performing printing along the basic raster scanning line is set independently.

10 Claims, 16 Drawing Sheets

— BASIC RASTER SCANNING LINE
--- ADDITIONAL RASTER SCANNING LINE
○ 600 DPI DATA

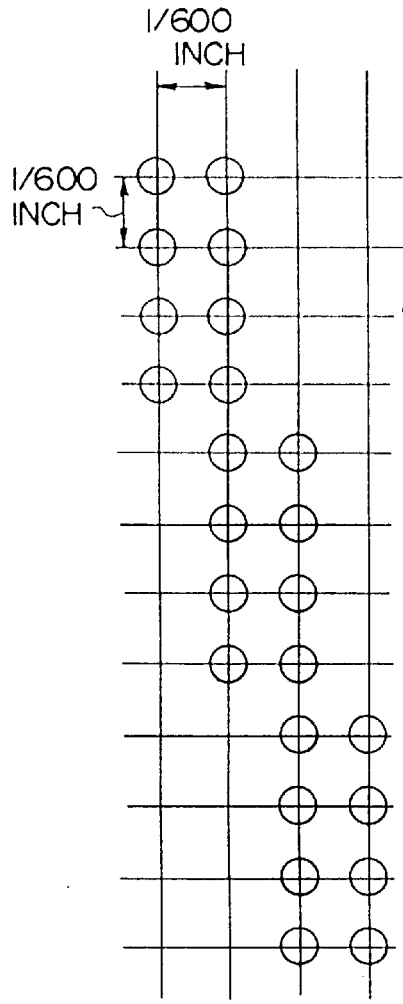
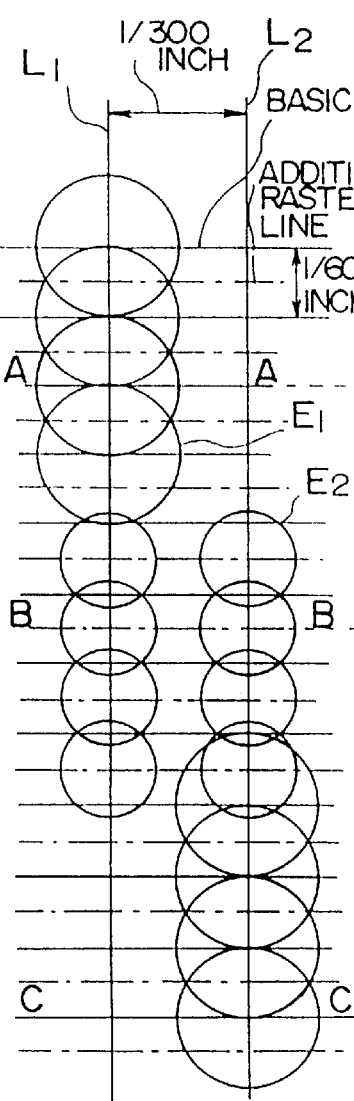
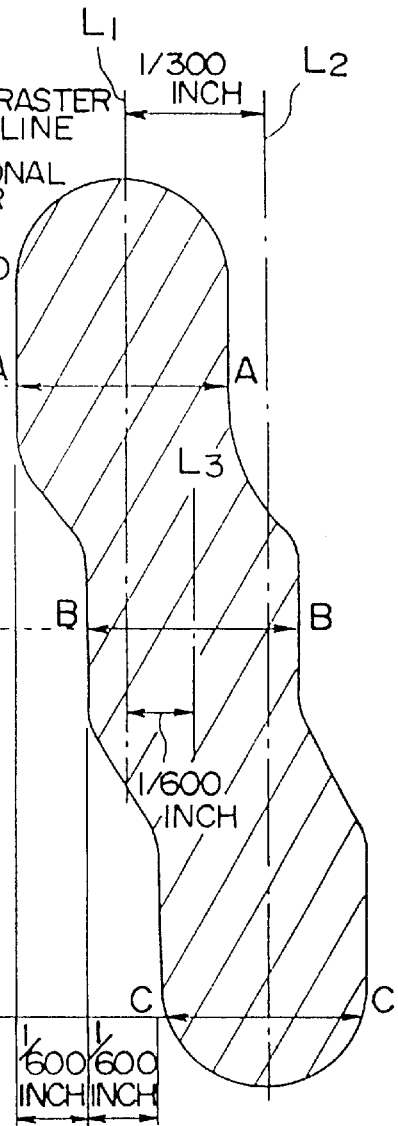
FIG. 8(a)
FIG. 8(b)
FIG. 8(c)
(a) 600 DPI DATA
(b) PRINTING TIMING AND LED HEAD DRIVE ENERGY
(c) ACTUALLY-PRINTED (a) 600 DPI DATA (b) PRINTING TIMING AND LED HEAD DRIVE ENERGY (c) ACTUALLY-PRINTED

PRINTER AND PROCESS FOR PRINTING DIFFERENT SIZE DOTS BY SETTING DRIVE ENERGIES BASED ON ADJACENT DATA BIT LOGIC

This is a continuation-in-part of U.S. patent application Ser. No. 08/078,910, filed Jun. 17, 1993, now abandoned.

BACKGROUND OF THE INVENTION a) Field of the Invention

This invention relates to a non-impact printer, and more specifically to a non-impact printer making use of an LED head as a print head.

b) Description of the Related Art

Non-impact printers led by electrophotographic printers receive print information for a host controller such as a microcomputer or a work station and perform printing by a print head such as an LED head.

The LED head employed in such non-impact printers is provided with light emitting diodes arranged at a predetermined density in a raster scanning direction. Depending on which level the density is set at, the resolution of a print to be obtained by an LED printer equipped with the LED head is determined. When this resolution is low, there are fewer dots per inch in the raster scanning direction. A picture so printed hence presents a zig-zag image at oblique lines so that the quality of the picture is low. To improve the quality of a print, an LED head having light emitting diodes at a high concentration is needed. Such an LED head is however difficult to manufacture so that its price is very high.

SUMMARY OF THE INVENTION

An object of the present invention is to provide a non-impact printer which can reduce a zig-zag image at oblique lines of a printed picture and hence improve the quality of the print by receiving print information of a resolution higher than that of an LED head itself and making the apparent dot density higher than the resolution of the LED head.

A non-impact printer according to this invention is provided with means for producing basic line timing signals adapted to perform printing along a basic raster scanning line and also with means for producing additional line timing signals between the successive basic line timing signals. These additional line timing signals are adapted to perform printing along an additional raster scanning line.

When received video signals have a resolution higher than that of an LED head, the logical AND between successive bit data of the video signals is carried out so that the video signals are converted to first signals formed of a data row corresponding to the resolution of the LED head.

Further means is also provided for transferring the first signals, as head data signals for performing the printing along the basic raster scanning line, to the LED head in correspondence to the respective basic line timing signals.

The exclusive-OR between the successive bit data of the video signals is carried out to convert the video signals to second signals formed of another data row. The second signals are outputted to a line buffer. Still further means is provided to transfer the second signals in the line buffer, as head data signals for performing the printing along the additional raster scanning line, to the LED head in correspondence to the respective additional line timing signals.

LED head drive energy for performing the printing along the basic raster scanning line and that for performing the printing along the additional raster scanning line are set independently.

It is also possible to print the logical AND between successive bit data of video signal on the additional raster scanning line and the exclusive-OR between the successive bit data on the basic raster scanning line.

As an alternative, it is also feasible to receive video signals on the same line twice. First, the logical AND between successive bit data of the video signals received first is carried out and is then printed. Next, the exclusive-OR between successive bit data of the video signals received second is carried out, followed by printing.

Further, LED head drive energy upon performing printing with the first signals obtained by the logical AND can be set greater than LED head drive energy upon performing printing with the second signals obtained by the exclusive-OR.

In addition, a non-impact printer according to this invention can comprises an LED head, an optical system for allowing light, which has been emitted from each light emitting diode of the LED head, to converge on a photoconductor drum, and means for transferring, as head data signals for performing printing along a raster scanning line, successive bit data of received video signals to the LED head in correspondence to line timing signals. In this case, by the LED head and the optical system, the size of each of luminescent points on the raster scanning line and the resolution are set to make the highest one of the emission intensities higher than the sensitivity of the photoconductor drum. The emission intensity distribution is controlled narrow so that, when the intensities of light at adjacent luminescent points are combined, a valley is formed between the adjacent luminescent points in an emission intensity distribution diagram.

In the non-impact printer according to this invention, the logical AND between successive bit data of received video signals is carried out when the video signals so received have a resolution higher than that of an LED head. The video signals are converted to first signals and, in correspondence to line timing signals, the first signals are transferred to the LED head as head data signals to be printed along the basic raster scanning line.

Further, the exclusive-OR between successive bit data of the video signals is carried out so that the video signals are converted to second signals. Corresponding to the additional timing signals, these second signals are then transferred to the LED head as head data signals to be printed along the additional raster scanning line.

LED head drive energy for performing printing along the basis raster scanning line and LED head drive energy for performing printing along the additional raster scanning line are set independently.

Accordingly, even when the resolution of video signals from a host computer is higher than that of a printing unit, it is still possible to receive the video signals. Based on the video signals so received, printing is performed along an additional raster scanning line so that zig-zag image of oblique lines in a picture can be reduced.

Furthermore, a still further non-impact printer according to this invention comprises an LED head, an optical system for allowing light, which has been emitted from each light-emitting diode of the LED head, to converge on a photoconductor drum, and means for transferring, as head data signals for performing printing along a raster scanning line, successive bit data of received video signals to the LED head in correspondence to line timing signals. In this case, by the LED head and the optical system, the size of each of luminescent points on the raster scanning line and the resolution of the optical system are set to make the highest one of the emission intensities higher than the sensitivity of the photoconductor drum. The emission intensity distribution is controlled narrow so that, when the intensities of light at adjacent luminescent points are combined, a valley is formed between the adjacent luminescent points in an emission intensity distribution diagram.

In this case, it is possible not only to print fine lines but also to reduce variations in print density compared with variations in emission intensity, thereby making it possible to provide a print with improved quality.

BRIEF DESCRIPTION OF THE DRAWINGS

FIGS. 8(a), 8(b) and 8(c) diagrammatically illustrates the appearance of a print by the non-impact printer according to the first embodiment of the present invention;

DESCRIPTION OF THE PREFERRED EMBODIMENTS

Figure 1:
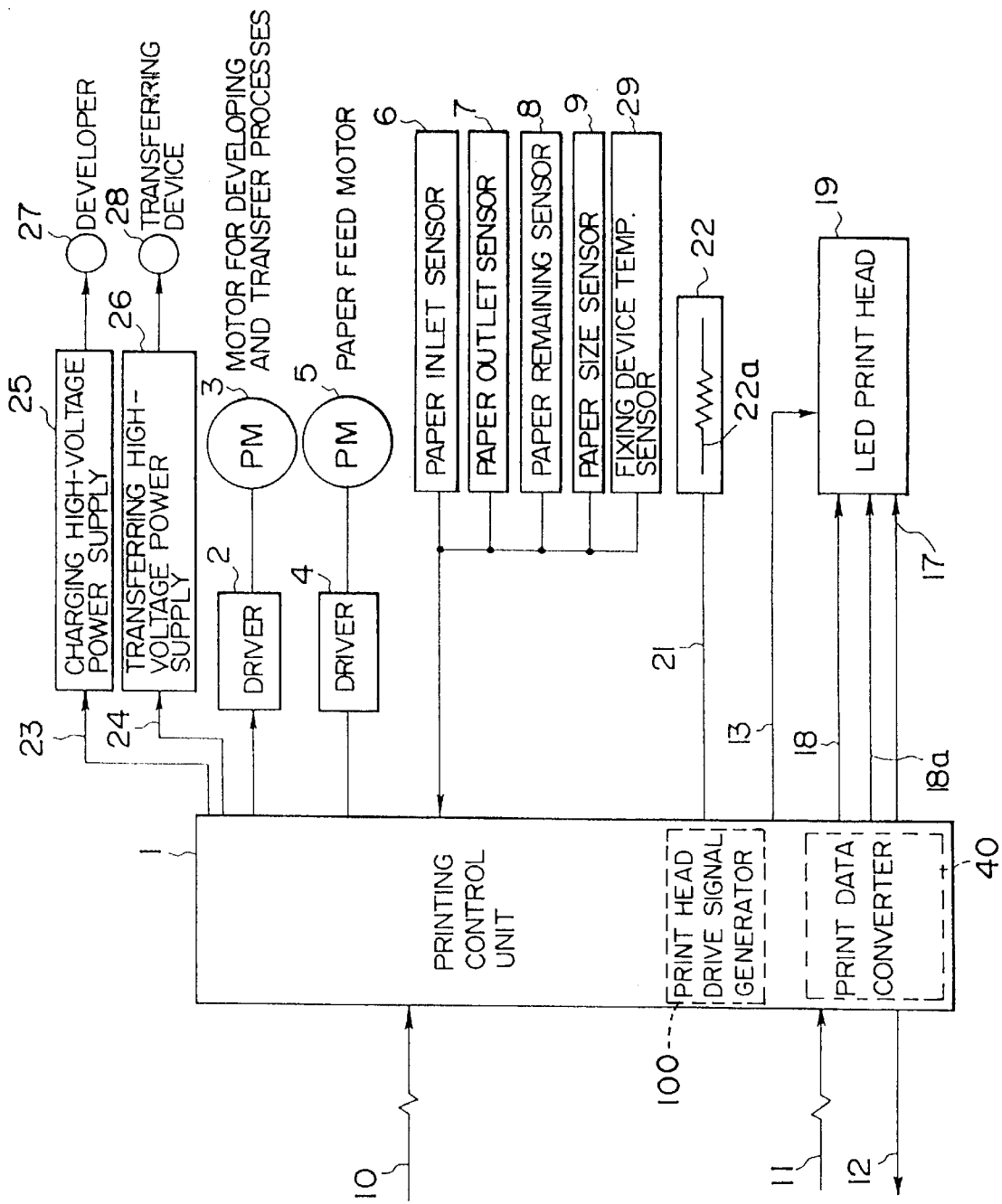
FIG. 1 is a block diagram of a control circuit of a non-impact printer according to a first embodiment of the present invention.

Referring first to FIG. 1, the non-impact printer according to the first embodiment of the present invention has a printing control unit 1 and an LED head 19. Although not specifically illustrated, the printing control unit 1 can be constructed of ROM, RAM, I/O port, timer circuit and the like or, as an alternative, can also be constructed a logical circuit having equivalent functions thereto. The printing control unit 1 receives, via an unillustrated interface, control signals 10 and video signals 11 from a host controller such as a personal computer or a work station. Through a print data converter 40, the printing control unit 1 outputs timing signals 12 to the host controller and print head drive signals 13, actual print data signals, i.e., head data signals 18, clock signals 18a and latching signals to the LED head 19. As a consequence, the LED head 19 is selectively actuated to form an electrostatic latent image on a developer 27.

In addition to receiving the control signals 10 and video signals 11 outputted from the host controller, the printing control unit 1 detects the condition of the non-impact printer itself on the basis of signals from sensors arranged in the non-impact printer itself such as a paper inlet sensor 6, a paper output sensor 7, a paper remaining sensor 8, a paper size sensor 9 and a fixing device temperature sensor 29, whereby the printing control unit 1 determines whether the non-impact printer is in condition ready for printing. If the temperature of a fixing device 22 is lower than a preset level, for example, the printing control unit 1 outputs a heater drive signal 21 to turn on a heater 22a, so that the heater 22a is heated to a temperature at which printing is feasible.

If the non-impact printer is in condition ready for printing, the printing control unit 1 outputs a drive signal to a driver 2 to turn on a motor 3 for developing and transfer processes. At the same time, the printing control unit 1 outputs a charging signal 23 to a charging high-voltage power supply 25 to charge the developer 27 and, at the same time, another charging signal 24 to a transferring high-voltage power supply 26 so that a toner image formed on the developer 27 is transferred onto a paper sheet by a transferring device 28.

The paper sheet is fed by outputting a drive signal to a driver through the printing control unit 1 and turning on a paper feed motor 5. By the paper remaining sensor 8 and the paper size sensor 9, the printing control unit 1 detects the kind of paper sheets which are set in the non-impact printer, followed by the initiation of paper feeding as needed for the paper sheets. Described specifically, the printing control unit 1 can drive through the driver 4 the paper feed motor 5 in both directions. A paper sheet, which has been set by first driving the paper feed motor 5 in reverse direction, is fed over a preset distance until the paper inlet sensor 6 detects the paper sheet. An unillustrated gear is next changed over to drive the paper feed motor 5 in normal direction, whereby the paper sheet is conveyed to a printing section of the non-impact printer. As soon as the paper sheet reaches a position where printing is feasible, the printing control unit 1 sends timing signals 12 (including both line timing signals and video signal transferring clock signals) to the host controller and receives the video signals 11 in correspondence to these timing signals 12. The video signals, which were compiled page by page by the host controller and have been received by the printing control unit 1, are converted to actual print data signal 18 by the print data converter 40 and are then delivered to the LED head 19. By the LED head 19, an electrostatic latent image is formed on the developer 27 as described above.

The printing control unit 1 fixes the transferred toner image on the thus-conveyed paper sheet by the heat of the fixing device 22 and, by the paper feed motor 5, conveys the paper sheet past the paper outlet sensor 7 to the outside of the non-impact printer.

A description is now made of a printing operation under the following conditions:

Resolution of the LED head 19 in the printing section of the non-impact printer (the pitch of arrangement of light emitting diodes): 300 DPI (raster scanning direction); resolution of the video signals 11 to be received: 600 DPI; resolution of an actually printed image: 300 DPI (raster scanning direction) and 1200 DPI (pseudo-600 DPI, printing direction, that is, direction of conveyance of paper sheet).

Figure 2:
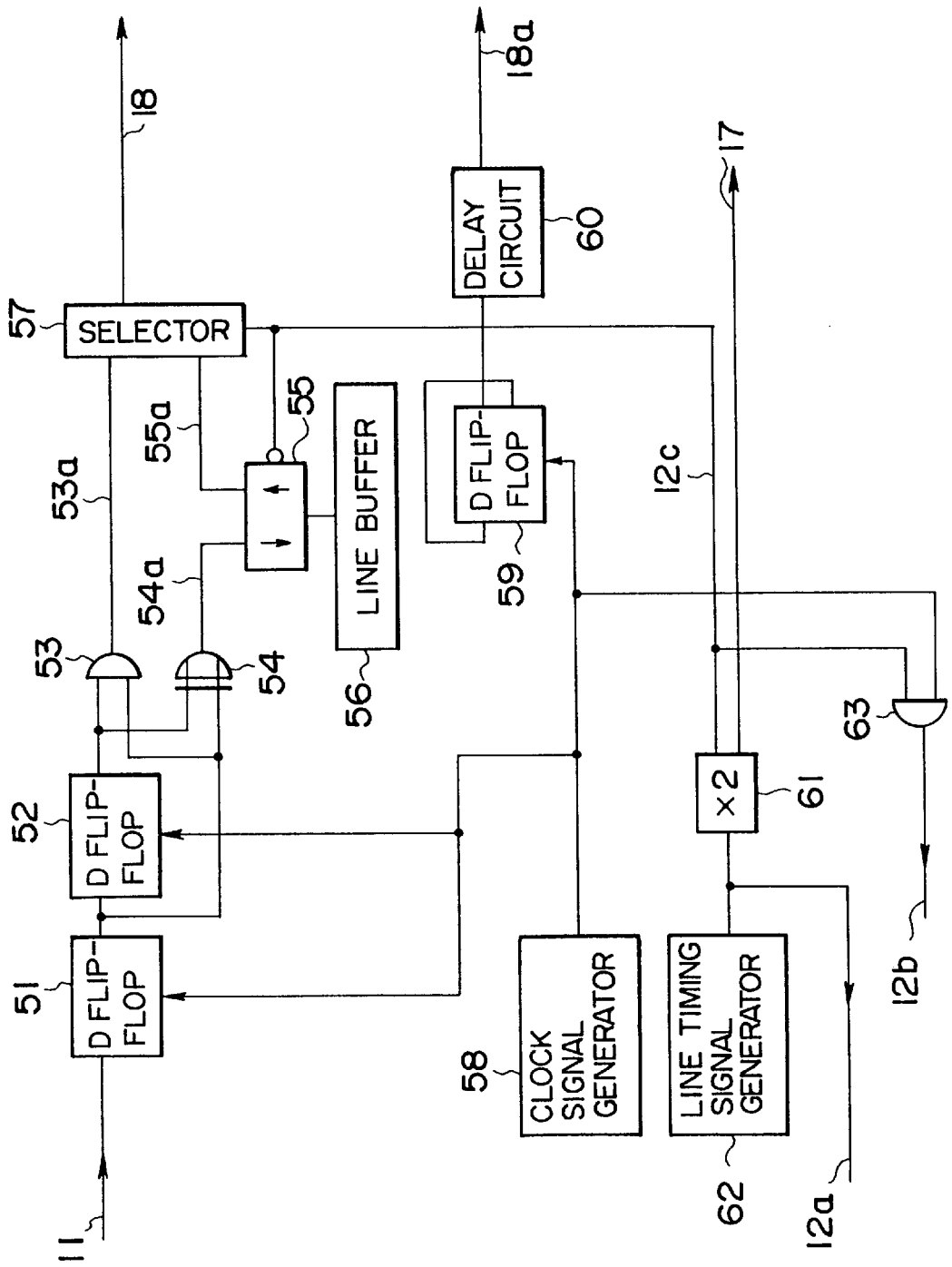
FIGS. 2 and 2A are a block diagram of a print data receiving circuit of the non-impact printer.
Figure 3:
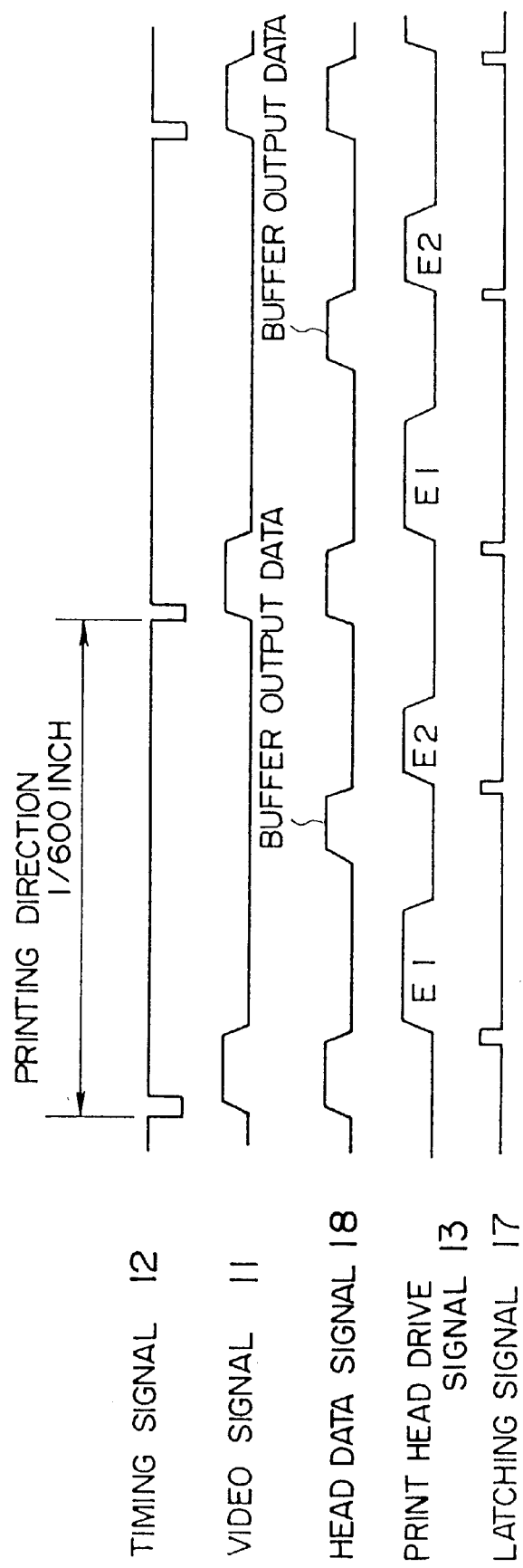
FIG. 3 is a time chart of the print data receiving circuit.
Figure 4:
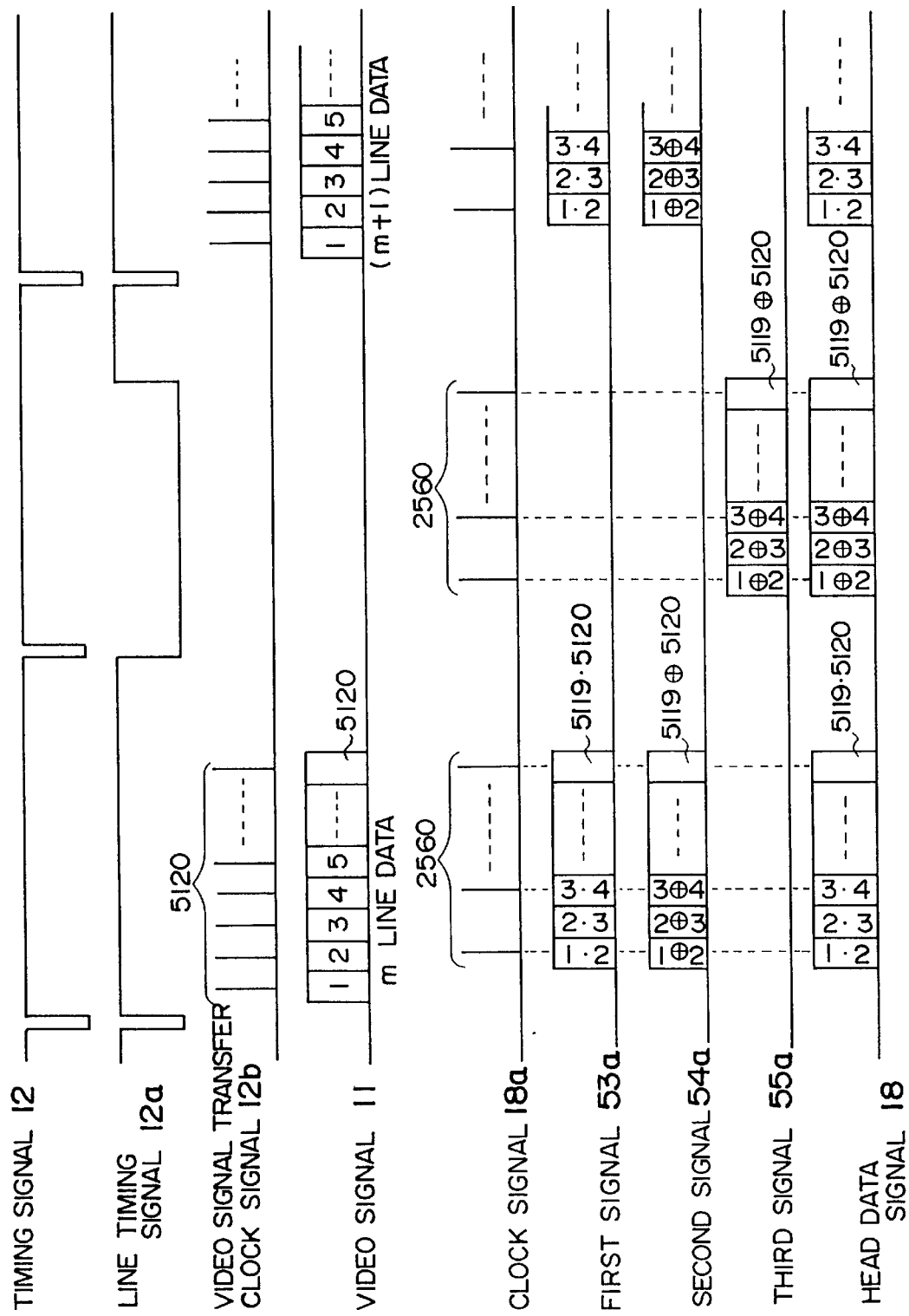
FIG. 4 is an enlarged diagram of the time chart.

Reference is now had to FIG. 2. When a paper sheet reaches the position where printing is feasible, the print data converter 40 transmits the timing signals 12, including both line timing signals 12a and video signal transferring clock signals 12b, to the host controller and receives the video signals 11. The video signals 11 of 600 DPI in both vertical and horizontal directions, said video signals 11 having been compiled page by page at the host controller, are converted to first signals 53a by D flip-flops 51,52 and an AND circuit of a resolution conversion block as illustrated in FIGS. 2 through 4. To print the first signals 53a along a basic raster scanning line, the first signals 53a are transferred as head data signals 18 to the LED head 19 via a selector 57. Further, second signals 54a which have been converted at the same time by an exclusive-OR circuit 54 are stored in a line buffer 56 via a selector 55 so that the second signals 54a will be printed along an additional raster scanning line formed between basic raster scanning lines.

FIG. 2 also shows a clock signal generator 58, a delay circuit 60, a line timing signal generator 62, a multiplier 61 for doubling the frequency of the line timing signals 12a generated by the line timing signal generator 62, and an AND circuit 63. By the multiplier 61, additional line timing signals 12c are generated to perform printing along the additional raster scanning line between the successive line timing signals 12a. Different from the video signal transfer clock signals 12b outputted from the printing section to the host controller, the clock signals 18a have been obtained by dividing the clock signals, which were generated by the clock signal generator 58, into two at a D flip-flop 59. The clock signals 18a are sent via the delay circuit 60 to the LED head 19 shown in FIG. 5.

Figure 2A:
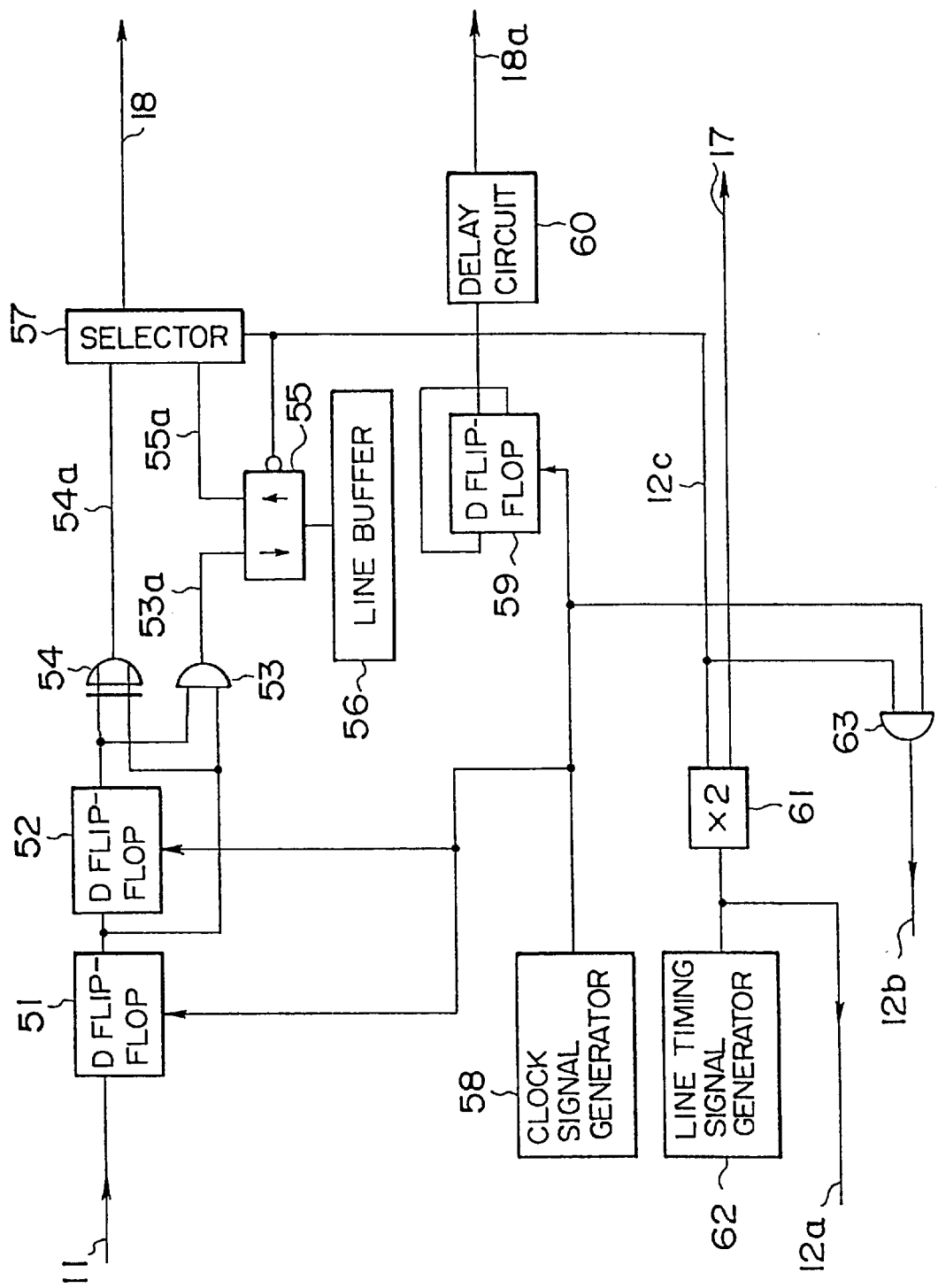

As should be understood, and referring now to FIG. 2A, in an alternate arrangement to the arrangement shown in FIG. 2, the first signals 53A from the AND circuit 53 may be stored in the line buffer 56 and the second signals 54A from the exclusive-OR circuit 54 may be forwarded directly to the selector 57.

Figure 5:
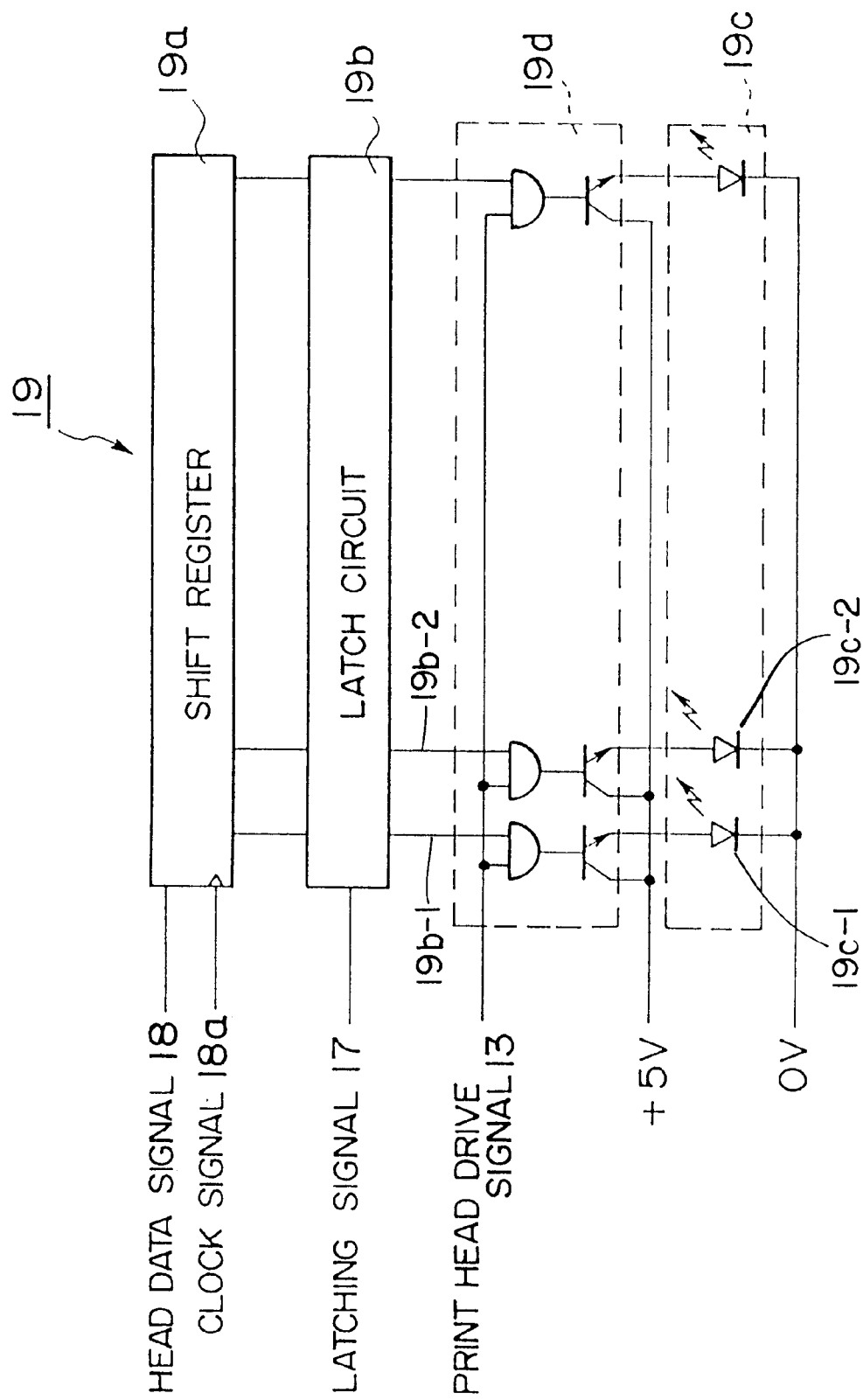
FIG. 5 is a block diagram of an LED head useful in the non-impact printer according to the first embodiment of the present invention.

Referring next to FIG. 5, the LED head 19 is constructed of a shift register 19a adapted to input the head data signals 18 and the clock signals 18a, a latch circuit 19b for holding output signals of the shift register 19a by latch signals 17, and a driver array 19d for receiving the print head drive signals 13 and supplying electric power to an LED array 19c.

As should be evident, each LED element in the LED array 19c has a corresponding driver element in the driver array 19d. Each driver element of the driver array 19d determines not only whether the corresponding LED array element emits energy, but also the intensity of the energy emitted. More particularly, whether each LED element emits energy is determined by whether the corresponding head data signal 18 is stored in the corresponding latch circuit 19b (by way of the shift register 19a) has a logic for printing. Preferably, and as seen in FIG. 5, each driver element in the driver array 19d includes a two-input AND gate that switches a transistor on if the driver element is to drive the corresponding LED element 19c-1, 19c-2, etc. in the LED array 19c. The head data signal 18 appears at one input of each driver element AND gate as a driver signal 19d-1, 19d-2, etc. The print head drive signal 13 is applied to the other input of each driver element for a first, longer period of time corresponding to a head drive energy E1 or a second, shorter period of time corresponding to a head drive energy E2, as shown in FIG. 3.

Accordingly, the amount of energy emitted by the LED array 19c in FIG. 5 is adjusted according to the amount of time the print head drive signal 13 is applied to the driver array 19d. Specifically, if the drive signal 13 is applied for a relatively longer drive time corresponding to E1 in FIG. 3, the amount of energy emitted corresponds to a relatively large dot developed on the photoconductive drum. If the drive signal 13 is applied for a relatively shorter drive time corresponding to E2 in FIG. 3, the amount of energy emitted corresponds to a relatively small dot developed on the photoconductive drum.

Figure 2B:
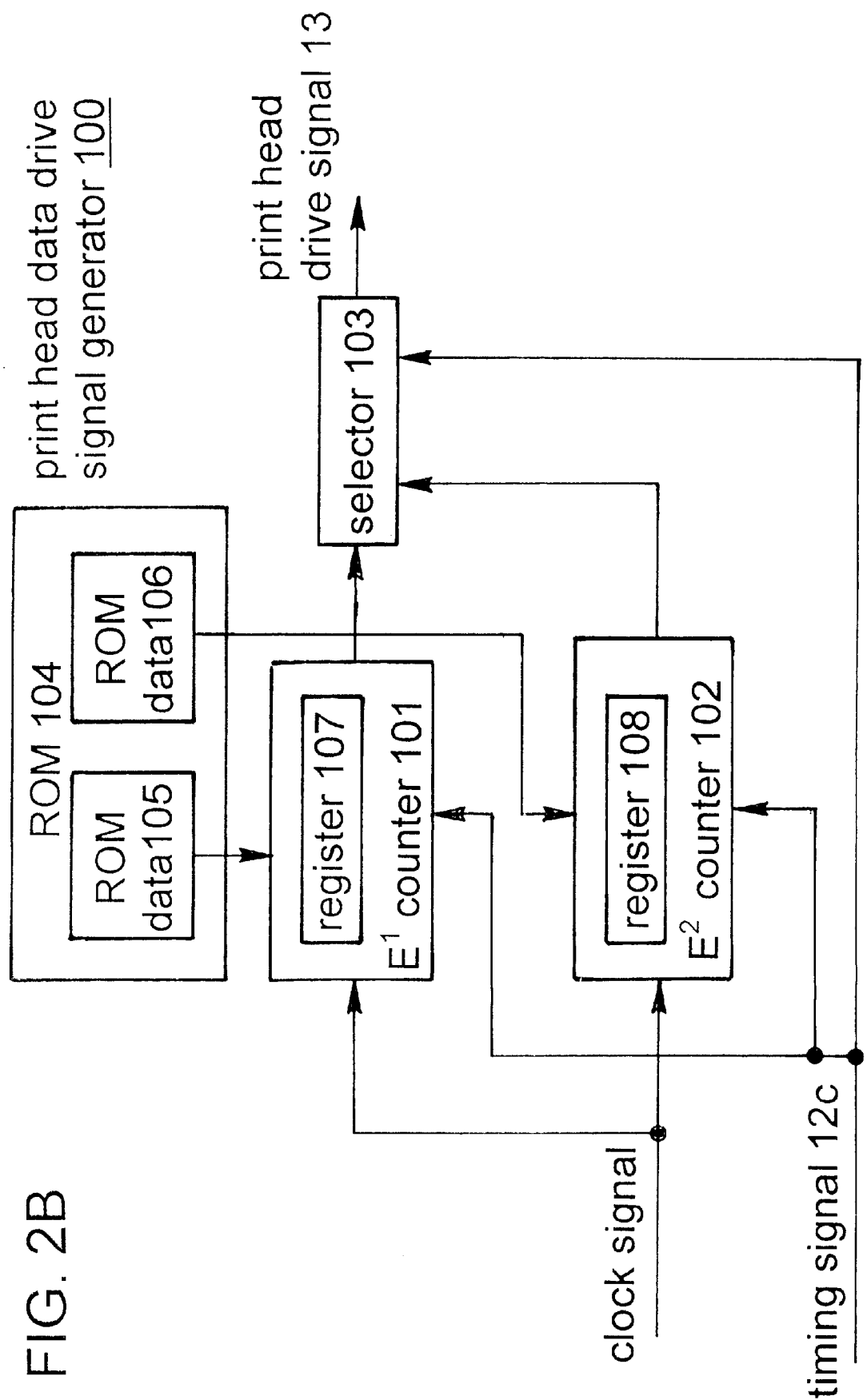
FIG. 2B is a block diagram of a print head data drive signal generator circuit of the printer.

Referring now to FIG. 2B, it is seen that in a preferred embodiment of the present invention, the print head drive signal 13 is generated by a print head data drive signal generator 100 that is included in the printing control unit 1. Specifically, the generator 100 includes an E1 counter 101 with a register 107, an E2 counter 102 with a register 108, a selector 103, and a ROM 104.

In operation, upon receiving the clock signal from the clock signal generator 58 (shown in FIG. 2), the E1 counter 101 reads a ROM data value 105 from the ROM 104 into the register 107, the E2 counter 102 reads a ROM data value 106 from the ROM 104 into the register 108, each counter 101, 102 outputs a logical high, and each counter 101, 102 begins accumulating a counting value according to the timing signal 12c from the print data converter 40 (shown in FIG. 2). When the counting value of each counter 101, 102 reaches the value in the respective register 107, 108, the output of the counter changes from a logical high to a logical low.

As should now be understood, the ROM data values 105, 106 respectively correspond to the first, longer period of time corresponding to the head drive energy E1 and to the second, shorter period of time corresponding to the head drive energy E2, as shown in FIG. 3. Accordingly, the E1 counter 101 outputs a logical high for the longer period of time and the E2 counter 102 outputs a logical high for the shorter period of time. The selector 103 is operated by the timing signal 12c in the same manner as the selector 57 (shown in FIG. 2) so that the output of each counter 101, 102 is alternately selected and outputted as the print head drive signal 13.

As one skilled in the art will appreciate, changes to the print head data signal generator 100 may be made and other types of generators 100 may be employed without departing from the spirit and scope of the present invention. For example, the ROM 104 may be a RAM instead, the data values 104, 105 may be stored directly in the counters 101, 102, or the generator 100 may be microprocessor-based, among other things.

The head data signals 18 and the clock signals 18a, which are both inputted to the LED head 19, are outputted from the print data converter 40 as will be described next.

Each first signal 53a is the logical AND of outputs from the D flip-flop 51 and the D flip-flop 52. As is shown in FIG. 4, the first bit datum is the logical AND of the first and second bit data of the video signal 11 of 600 DPI, the second bit datum is the logical AND of the second and third bit data, . . . . The first signals 53 are transferred as head data signals 18 to the LED head 19 via the selector 57. Since each clock signal 18a is outputted in synchronization with an $(n+1)^{th}$ datum (n: even number) of the head data signals 18 owing to the provision of the flip-flop 59 and the delay circuit 60, the bit data which are successively stored in the shift register 19a disposed in the LED head 19 shown in FIG. 5 are only $(n+1)^{th}$ bit data (n: even numbers) of the head data signals 18. Signals to be printed along a basic raster scanning line are therefore the logical AND of the $1^{st}$ and $2^{nd}$ bit data of the video signals 11, the logical AND of the $3^{rd}$ and $4^{th}$ bit data of the video signals 11 . . . , the logical AND of the $(2m+1)^{th}$ and $(2m+2)^{th}$ bit data of the video signals 11 (m=0, 1, 2, . . . , 2559), . . .

Since each second signal 54a is the exclusive-OR of signals outputted from the D flip-flop 51 and the D flip-flop 52, respectively, the first bit datum is the exclusive-OR of the $1^{st}$ and $2^{nd}$ bit data of the 600 DPI video signals 11, the $2^{nd}$ bit datum is the exclusive-OR of the $2^{nd}$ and $3^{rd}$ bit data of the 600 DPI video signals 11, . . . . The second signal 54a is stored in the line buffer 56 via the selector 55 and, upon performing printing along the additional raster scanning line, is read as the third signal 55a via the selector 55 and then transferred as the head data signal 18 to the LED head 19 via the selector 57. Similarly to the printing along the basic raster scanning line, it is designed that each clock signal 18a is sent to the LED head 19 in synchronization with the $(n+1)^{th}$ (n: even number) bit datum of the head data signals 18. The bit data successively stored in the shift register 19a are only the $(n+1)^{th}$ (n: even numbers) bit data of the head data signals 18. Accordingly, those to be printed along the additional raster scanning line are the exclusive-OR of the $1^{st}$ and $2^{nd}$ bit data of the video signals 11, the exclusive-OR of the $3^{rd}$ and $4^{th}$ bit data of the video signals 11, . . . , the logical exclusive-OR of the $(2m+1)^{th}$ and $(2m+2)^{th}$ bit data of the video signals 11 (m=0, 1, 2, . . . , 2559) . . . .

Figure 6:
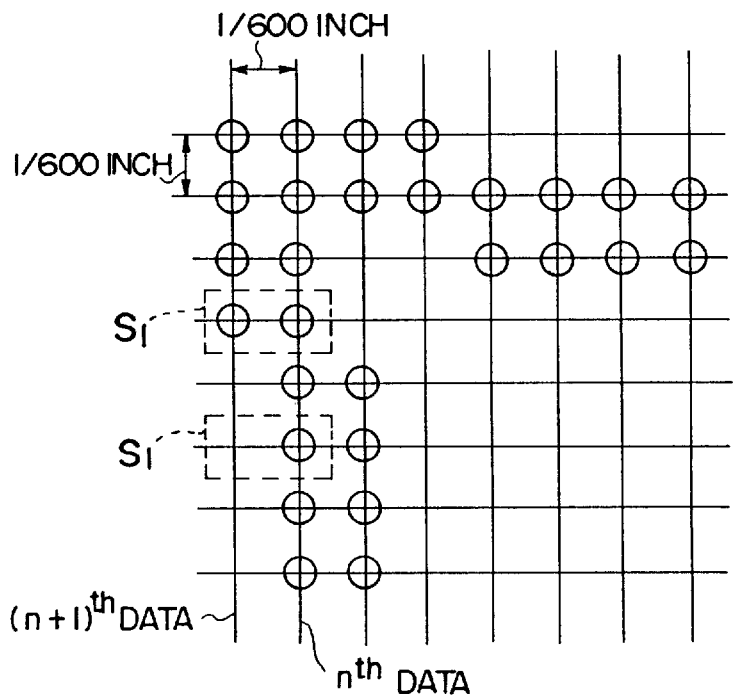
FIG. 6 diagrammatically shows bit data of video signals received by the non-impact printer according to the first embodiment of the present invention.
Figure 7:
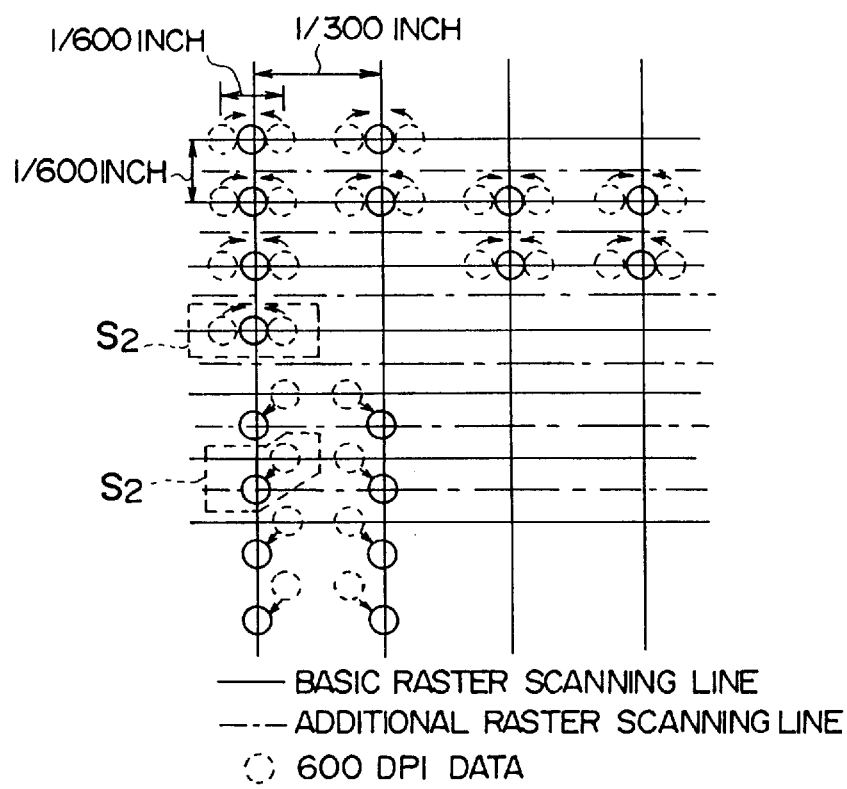
FIG. 7 diagrammatically illustrates bit data of head data signals in the non-impact printer according to the first embodiment of the present invention.

Regarding, for example, the video signals 11 received at 600 DPI as shown in FIG. 6, bit data of the logical ANDs of the $(n+1)^{th}$ (n: even numbers) bit data and the $n^{th}$ (n: even numbers) bit data of the video signals 11 are printed along the basic raster scanning line as shown in FIG. 7, whereas bit data of the exclusive-ORs of the $(n+1)^{th}$ (n: even numbers) bit data and the $n^{th}$ (n: even numbers) bit data of the video signals 11 are printed along the additional raster scanning line. Namely, the bit data in $S_1$ shown in FIG. 6 are converted to the bit data in $S_2$ illustrated in FIG. 7.

After transferring one line of the head data signal 18 to LED head 19, the printing control unit 1 sends the latch signal 17 to the LED head 19 so that the $(n+1)^{th}$ bit data of the converted head data signals 18 are held in the LED head 19. The LED head 19 has a number of light emitting diodes arranged in the raster scanning direction. Upon receipt of the print head drive signal 13, the LED head 19 is driven with LED head drive energy E1 by the bit data held therein and forms an electrostatic latent image on the photoconductor drum.

When the paper sheet reaches a position 1/1200 inch apart in the paper conveying direction, the printing control unit 1 then changes over the selectors 55,57 to take out the bit data (the third signals 55a) stored in the line buffer 56. By the clock signals 18a, the third signals 55a are transferred as the head data signals 18 to the LED head 19. At this time, the line timing signals 12a are not generated to the host controller and the above operation is practiced by the printing section alone.

The printing control unit 1 then delivers a latching signal 17 to the LED head 19, whereby the above bit data signals are held in the LED head 19. Upon receipt of the print head drive signal 13, the LED head 19 is driven with LED head drive energy E2 by the bit data held therein and forms an electrostatic latent image on the photoconductor drum.

At the developer 27, picture-forming toner charged negative is attracted to the individual dots by electrically attracting force to form a toner image. The toner image is sent to the transferring device 28.

On the other hand, the transferring high-voltage power supply 26 of positive potential is turned on by the charge signal 24, and the transferring device 28 transfers the toner image onto a paper sheet which is passing through a gap between the photoconductor drum and the transferring device 28.

The paper sheet carrying the toner image transferred thereon is conveyed while being maintained in contact with the fixing device 22 having the heater 22a accommodated therein. As a result, the toner image is fixed by the heat of the fixing device 22. The paper sheet with the toner image so fixed is conveyed further from the printing section and past the paper outlet sensor 7 and is then ejected to the outside of the non-impact printer.

Responsive to the detection of the paper sheet by the paper size sensor 9 and the paper inlet sensor 6, the printing control unit 1 applies a voltage to the transferring device 28 from the transferring high-voltage power supply 26 only for the period during which the paper sheet passes by the transferring device 28. When the printing is completed and the paper sheet is conveyed past the paper output sensor 7, the application of the voltage to the developer 27 by the charging high-voltage power supply 25 is stopped and, at the same, the rotation of the motor 3 for developing and transferring processes is stopped.

After that, the above operation is repeated.

Figure 9A:
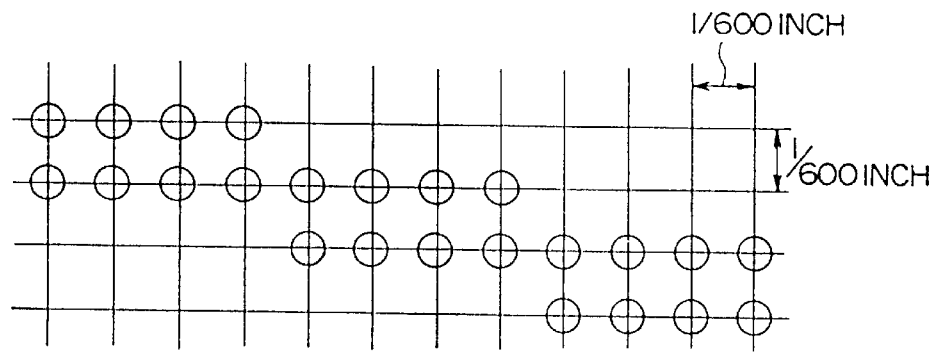
FIGS. 9(a), 9(b) and 9(c) diagrammatically illustrates the appearance of another print by the non-impact printer according to the first embodiment of the present invention.
Figure 9B:
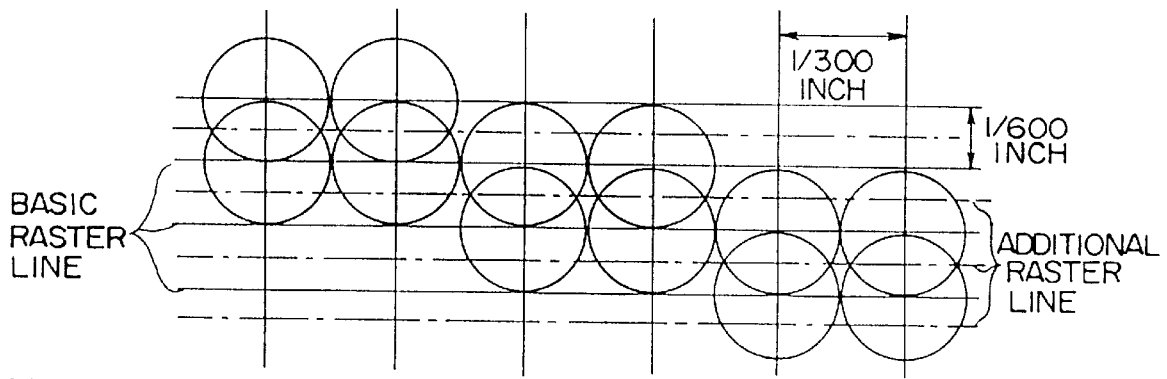
Figure 9C:
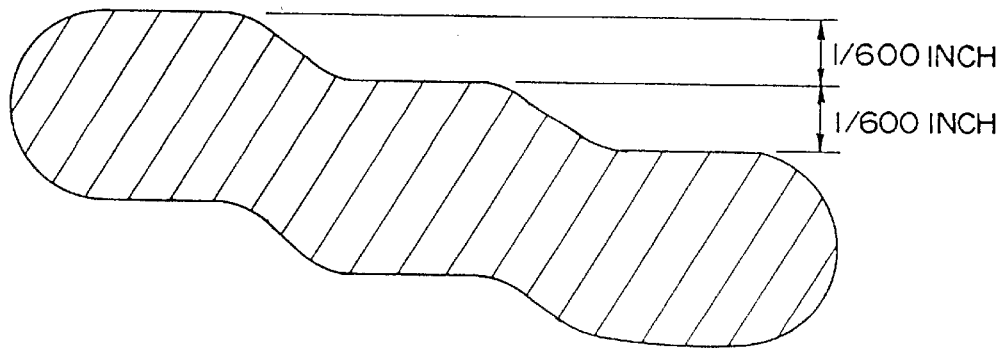

Here, the LED head drive energies E1,E2 per line are set so that, as illustrated in FIGS. 8 and 9, a dot image formed by printing at pseudo-600 DPI becomes equivalent to a dot image printed at standard 300 DPI.

As is shown in FIG. 8(b), printing with the LED head drive energy E1 is performed along basic raster scanning lines on lines $L_1$ and $L_2$ 1/300 inch apart from each other and printing with the LED head drive energy E2 is effected along additional raster scanning lines. The image actually printed here are formed of print portions such as A—A and C—C on the basic raster scanning lines and print portions such as B—B on the additional raster scanning lines.

In the first embodiment, conversion is effected to increase data at positions 1200 DIP apart from each other. The LED head drive energies E1,E2 are therefore set to satisfy the following inequality:

E1>E2

The required LED head drive energies E1,E2 are set as follows on the basis of the LED head drive energy E for standard 300 DPI, although they vary depending on the characteristics of the developer 27, lens and toner:

E1=(0.4 to 0.6)×E

E2=(0.15 to 0.25)×E

Figure 10:
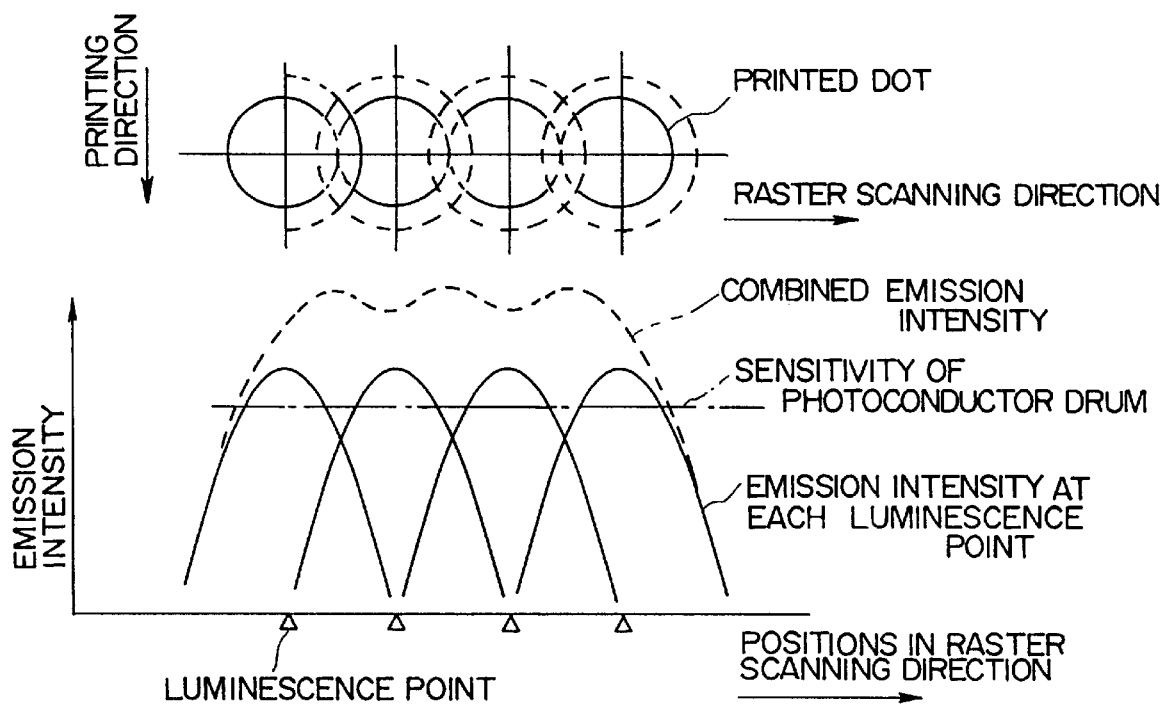
FIG. 10 diagrammatically shows dots printed on a raster scanning line by a first method and emission intensities corresponding to the printed dots.
Figure 11:
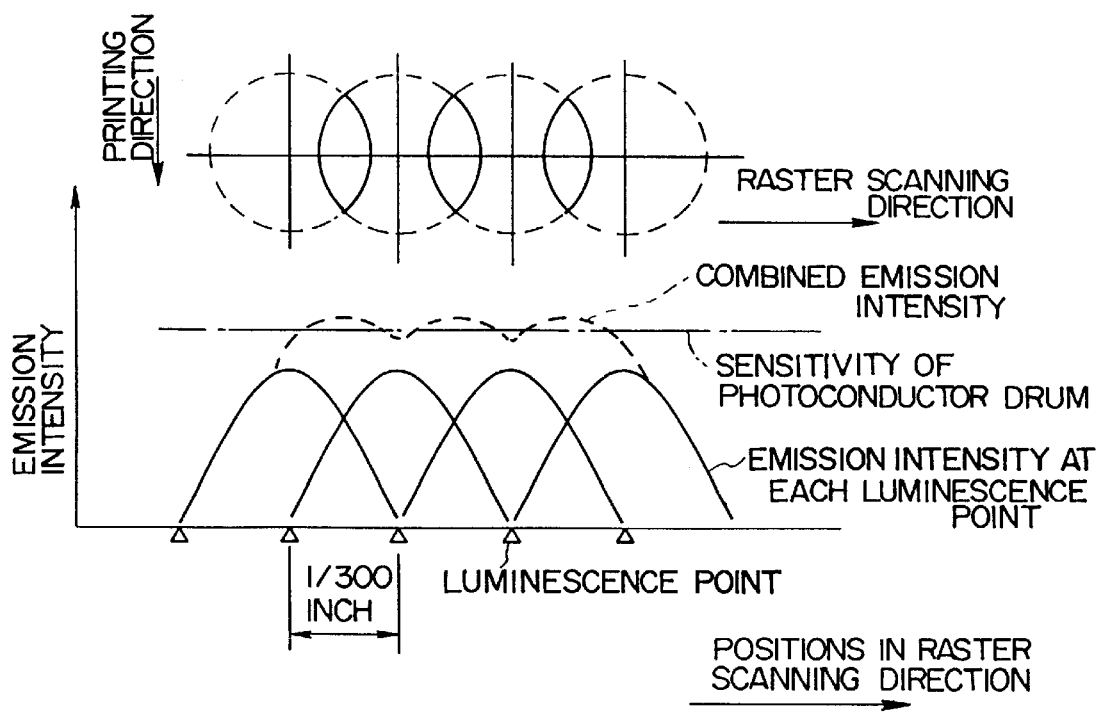
FIG. 11 diagrammatically depicts dots printed on a raster scanning line by a second method and emission intensities corresponding to the printed dots.

Referring next to FIGS. 10 and 11, a description will be made of a method for performing printing at a resolution higher than that of the LED head 19.

In FIG. 10, the emission intensity at a luminescent point by each light emitting diode of the LED head 19 (see FIG. 1) sufficiently exceeds the sensitivity of the photoconductor drum so that printed dots are formed at the positions of individual luminescent points.

At this time, the emission intensity at an intermediate part between adjacent fluorescent points is increased because of lighting of the adjacent luminescent points, and exceeds the sensitivity of the photoconductor drum. Such a high emission intensity is needed to form an image. Therefore, printing is also conducted at the intermediate part so that the adjacent dots are connected via the dot at the intermediate part.

In FIG. 11, the emission intensity at each single luminescent point does not exceed the sensitivity of the photoconductor drum although an emission intensity higher than the sensitivity is required for the formation of an image. No printed dot is therefore formed. When adjacent luminescent points are lit up at the same time, on the other hand, the combined emission intensity exceeds the sensitivity of the photoconductor drum at the intermediate part. It is therefore possible to form a printed dot at the intermediate part. Namely, it is possible to perform printing at a resolution twice as high as that of the printing section.

Figure 12A:
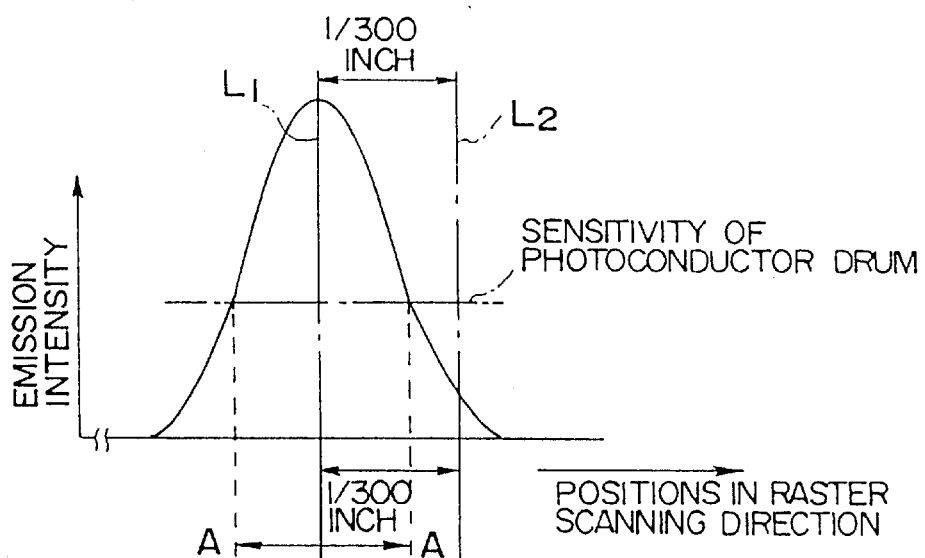
FIGS. 12(a), 12(b) and 12(c) diagrammatically shows emission intensities in the actually-printed image of FIG. 8.
Figure 12B:
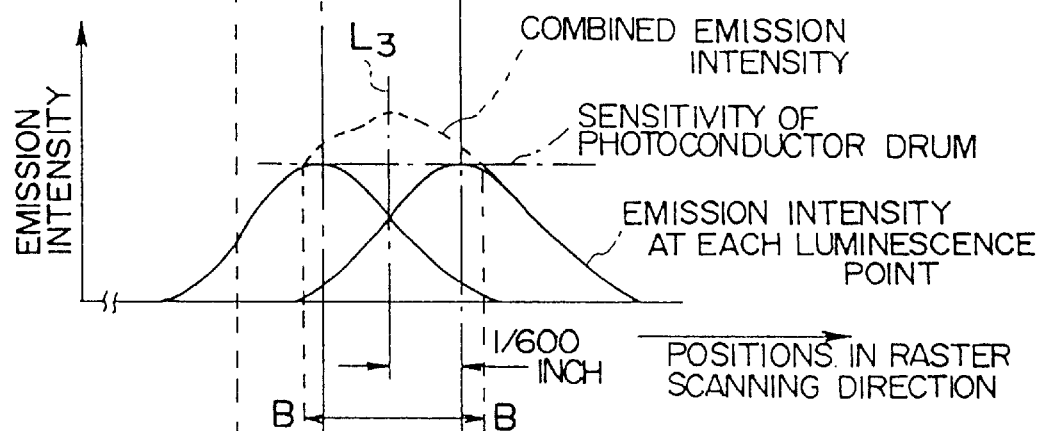
Figure 12C:
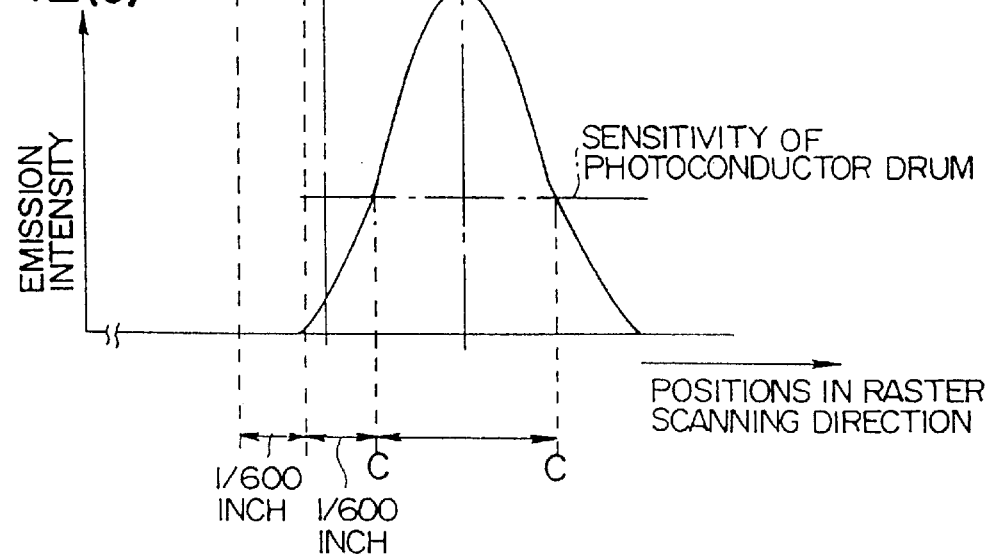

FIGS. 12(a), 12(b) and 12(c) diagrammatically illustrate emission intensities in an actually-printed image shown in FIG. 8(c). FIG. 12(a) shows the emission intensity along a print portion A—A, FIG. 12(b) the emission intensity along a print portion B—B, and FIG. 12(c) the emission intensity along a print portion C—C.

FIG. 12(a) indicates an emission intensity when printing was performed with the LED head drive energy E1 [FIG. 8(b)] on the basic raster scanning line. At the portion where the emission intensity exceeds the sensitivity of the photoconductor drum, the print portion A—A in the actually-printed image of FIG. 8(c) is formed.

FIG. 12(b) indicates an emission intensity when printing was performed with the LED head drive energy E2 on the additional raster scanning line. At the portion where the emission intensity exceeds the sensitivity of the photoconductor drum, the print portion B—B in the actually-printed image of FIG. 8(c) is formed. In this case, the emission intensity becomes highest on a line $L_3$ located between lines $L_1$ and $L_2$ so that a printed dot is also formed on the line $L_3$ (pseudo-600 DPI).

FIG. 12(c) indicates an emission intensity when printing was performed with the LED head drive energy E1 on the basic raster scanning line. At the portion where the emission intensity exceeds the sensitivity of the photoconductor drum, the print portion C—C in the actually-printed image of FIG. 8(c) is formed.

In the first embodiment described above, the logical AND between successive bit data is carried out by the print data receiver and is printed on a basic raster scanning line and, at the same time, the exclusive-OR between the successive bit data is carried out by the print data receiver and is printed on an additional raster scanning line. As an alternative, it is also possible to carry out the logical AND between successive bit data by the print data receiver and to print it on an additional raster scanning line and, at the same time, to carry out the exclusive-OR between the successive bit data by the print data receiver and to print it on a basic raster scanning line.

When dots are printed between individual luminescent points as shown in FIG. 11 described above, signals to be printed on a basic raster scanning line and an additional raster scanning line can be generated in the following manner.

First, every second data signals are selected from 600 DPI video signals inputted, whereby first head data signals of 300 DPI are generated and printed on a basic raster scanning line. The generation of the first head data signals can be effected by selecting video signals upon output of the video signal transferring clock signals 12b. Since these first head data signals correspond to the positions of the respective luminescent points, the printing is controlled so that the emission intensity at each single luminescent point exceeds the sensitivity of the photoconductor drum.

Next, the remaining data signals are selected to generate the above 300 DIP signals from the 600 DPI signals inputted, followed by the generation of second head data signals of 300 DPI in a similar manner. These data signals can be selected in a similar manner to the above-described first head data signals by using clock signals which have the same frequency as the above video signal transferring clock signals 12b but are shifted in phase by 1 clock of the video signals. Each second head data signal corresponds to a dot between each two adjacent luminescent points of the LED head. To print the dot, the luminescent points on the opposite sides are lit. The emission intensity at this time is adjusted so that, as illustrated in FIG. 11, light is emitted with an emission intensity not reaching the sensitivity of the photoconductor drum at each single luminescent point but exceeding the sensitivity at each part where light beams emitted from two adjacent pixels, respectively, are overlapped.

The non-impact printer according to the second embodiment of the present invention will be described next.

The non-impact printer of the second embodiment is not provided with any line buffer adapted to store bit data to be printed along an additional raster scanning line. To perform printing along the additional raster scanning line, line timing signals 12a are sent to a host controller to receive, as video signals 11, the same 600 DPI data as those printed along a basic raster scanning line. The 600 DPI data are then converted to head data signals 18.

Figure 13:
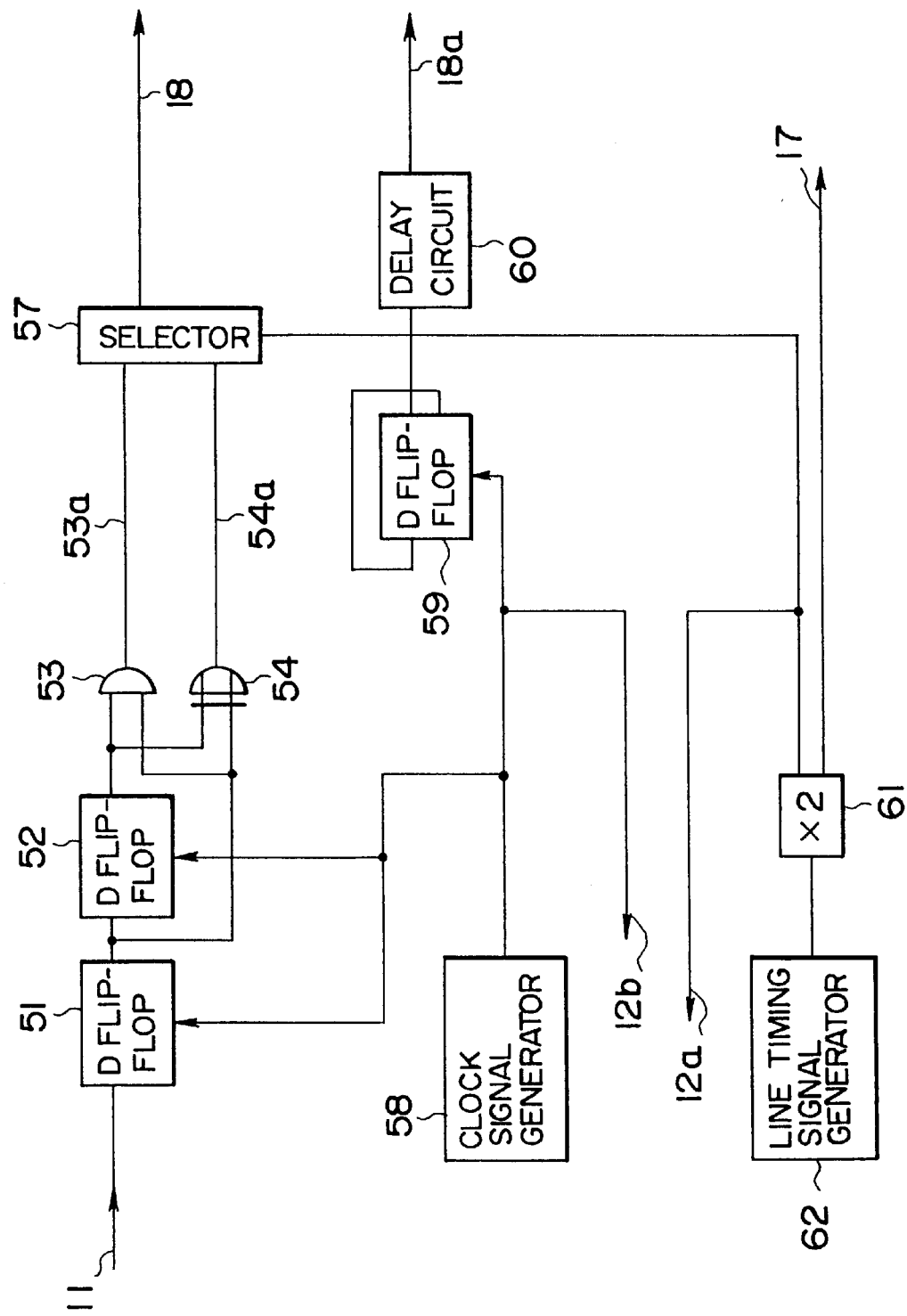
FIG. 13 is a block diagram of a print data receiver in a non-impact printer according to a second embodiment of the present invention.
Figure 14:
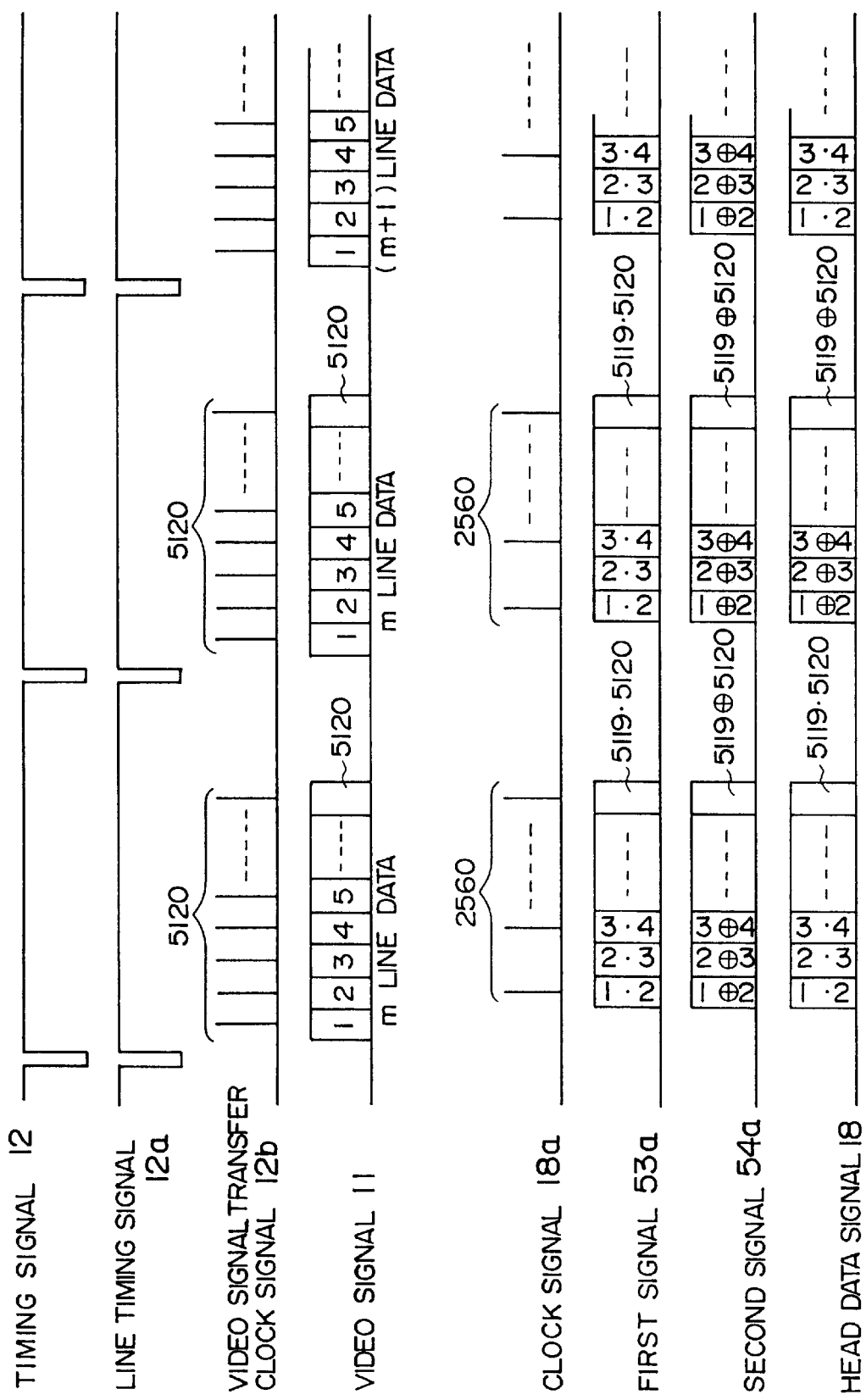
FIG. 14 is an enlarged time chart of the print data receiver in a non-impact printer according to a second embodiment of the present invention.

In FIGS. 13 and 14, there are illustrated D flip-flops 51, 52, 59, an AND circuit 53, an exclusive-OR circuit 54, a selector 57, a clock signal generator 58, a delay circuit 60, a multiplier 61, and a line timing signal generator 62.

To perform printing along a basic raster scanning line, line timing signals 12a conforming with timing signals 12 are sent to an unillustrated host controller. Bit data on the $m^{th}$ line of 600 DPI data are transmitted as video signals 11. The AND circuit 53 carries out the logical AND between outputs from the D flip-flops 51, 52 and the logical AND is outputted to the selector 57. Here, the selector 57 selects the first signal 53a, the output from the AND circuit 53, and transfers it as a head data signal 18 to the LED head 19 (FIG. 1). Like the first embodiment, each clock signal 18a is obtained by dividing a clock, which has been generated by the clock signal generator 58, into two by the D flip-flop 59. The clock signal 18a is delivered to the LED head 19 through the delay circuit 60. The clock signal 18a is synchronized with the $(n+1)^{th}$ (n: even number) bit datum of the first signal 53a. Bit data similar to those obtained in the first embodiment are therefore sent to the shift register 19a of the LED head 19 (see FIG. 5) and are then printed.

To perform printing along an additional raster scanning line, line timing signals 12a are sent to the host controller. At this time, the same bit data on the $m^{th}$ line as the bit data for the basic raster scanning line are transmitted as video signals 11 from the host controller. The exclusive-OR circuit 54 carries out the exclusive-OR between outputs from the D flip-flops 51, 52, followed by the output of the exclusive-OR to the selector 57. At this time, the selector 57 selects the second signal 54a, the output from the exclusive-OR circuit 54 and transfers it as a head data signal 18 to the LED head 19. Since the clock signal 18a is sent as in the case of the basic raster scanning line, printing is performed as in the first embodiment.

Even when the line buffer 56 (FIG. 2) is not provided in the printing control unit 1, the same printing results can be obtained as in the first embodiment by sending data on the same $m^{th}$ line twice from the host controller.

In the second embodiment described above, the logical AND between successive bit data is carried out by the print data receiver and is printed on a basic raster scanning line and, at the same time, the exclusive-OR between the successive bit data is carried out by the print data receiver and is printed on an additional raster scanning line. As an alternative, it is also possible to carry out the logical AND between successive bit data by the print data receiver and to print it on an additional raster scanning line and, at the same time, to carry out the exclusive-OR between the successive bit data by the print data receiver and to print it on a basic raster scanning line.

In the second embodiment described above, each adjacent two luminescent points are lit at the same time. Their emission intensities are combined to perform printing at an intermediate part between the luminescent points. A broad emission intensity distribution is therefore needed. It is therefore necessary to use light having a broad emission intensity distribution. Use of light having a broad emission intensity distribution, however, results in greater variations in print density compared with variations in emission intensity.

A broad emission intensity distribution can be expressed by the following formula (1):

$$P(x,y) A e^{-2(x^2+y^2)/\tau^2} \quad (1)$$

The formula (1) is generally known as a formula representing the emission intensity distribution of a laser beam. $P(x,y)$ is the emission intensity at coordinates $(x,y)$, A is a parameter associated with the emission intensity $P(x,y)$, and $\tau$ is a parameter indicating the breadth of the emission intensity distribution. The greater the parameters A and $\tau$, the greater the emission intensity $P(x,y)$ and the broader the distribution. When printing is performed as a part where the emission intensity $P(x,y)$ is equal to or higher than the sensitivity $E_{th}$ of the photoconductor drum, the print area S can be expressed by the following formula (2):

$$S = \pi \tau^2 / 2 \cdot (\log A - \log E_{th}) \quad (2)$$

Partially differentiating the formula (2) with respect to a parameter A in order to investigate the rate of a change of the print area S relative to a change in the parameter A, $$\partial S / \partial A = (\pi \tau^2 / 2) \cdot (1/A) \quad (3)$$

From the formula (3), it is appreciated that the print area S undergoes a greater change as the rate of a change of the parameter $\tau$ relative to a change of the parameter A increases, namely, as the emission intensity distribution becomes broader. As described above, the print density varies greater compared to variations of the emission intensity $P(x,y)$.

A description will next be made of an embodiment which can reduce variations in print density relative to variations in the emission intensity $P(x,y)$.

Figure 15:
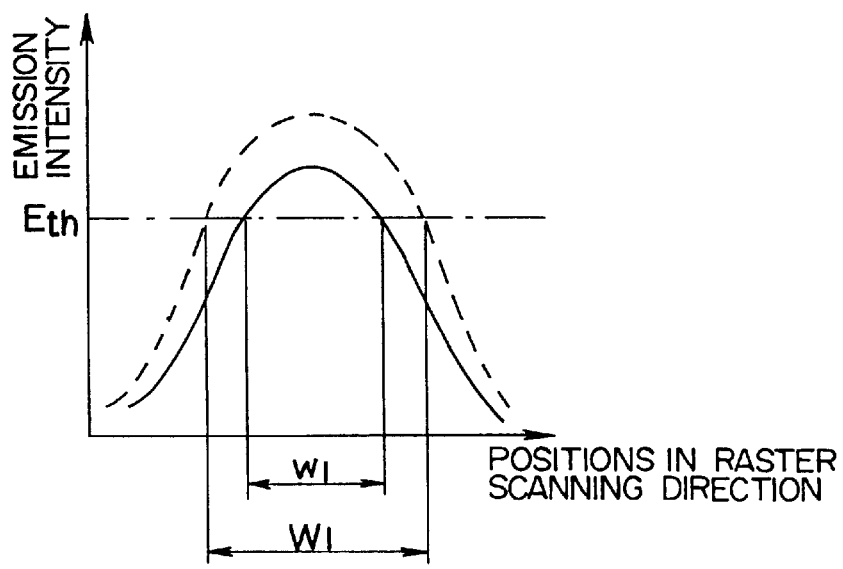
FIG. 15 is a plot of the relationship between emission intensity versus print density where the emission intensity distribution is broad.
Figure 16:
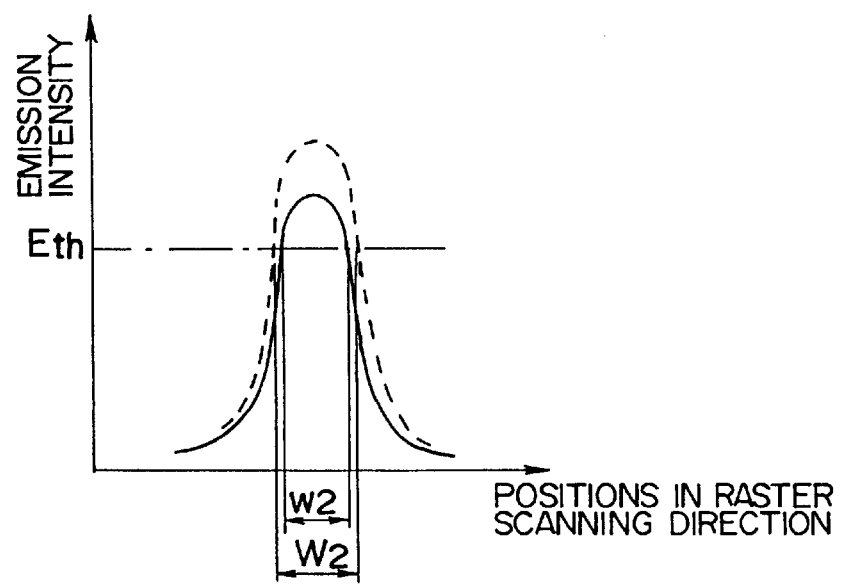
FIG. 16 is a plot of the relationship between emission intensity versus print density where the emission intensity distribution is narrow.

Reference is now had to FIGS. 15 and 16, which shows the emission intensity in the raster scanning direction only. In each of these drawings, $E_{th}$ indicates the sensitivity of a photoconductor drum, the solid curve a standard emission intensity, the dashed curve an emission intensity higher than the standard emission intensity, $w_1, w_2$ print widths at the standard emission intensity, and $W_1, W_2$ print widths at the higher emission intensity.

When the emission intensity varies and becomes greater than the standard emission intensity, for example, the print density varies by $W_1/w_1$ when the emission intensity distribution is broad, while the print density varies by $W_2/w_2$ when the emission intensity distribution is narrow.

Here, $W_1/w_1 > W_2/w_2$.

It is hence understood that a narrower emission intensity distribution leads to smaller variations in print density even if the emission intensity varies.

Figure 17A:
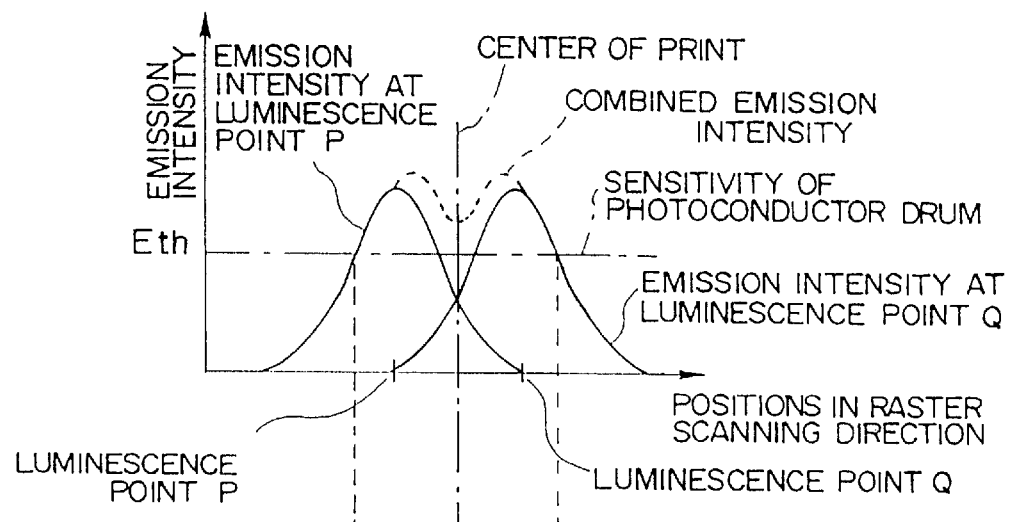
FIGS. 17(a) and 17(b) diagrammatically illustrate an emission intensity when printing is performed by a non-impact printer according to a third embodiment of the present invention.
Figure 17B:
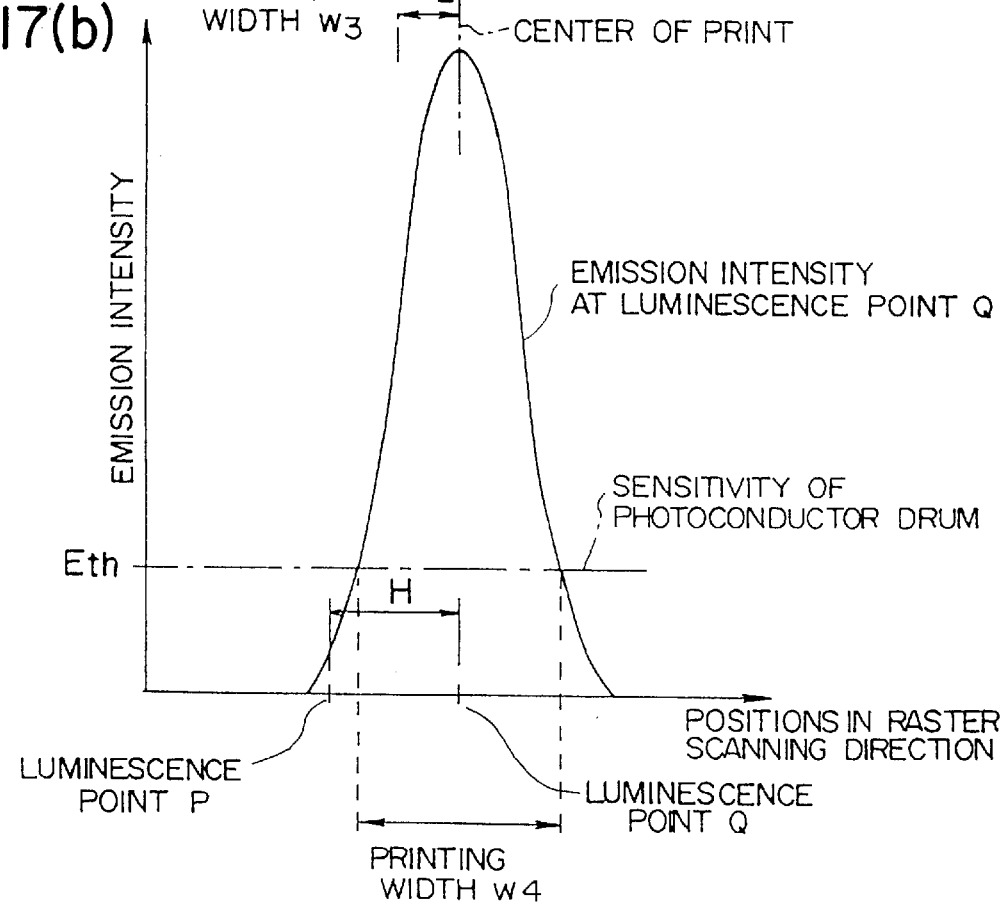

Reference is next had to FIGS. 17(a) and 17(b), in which FIG. 17(a) indicates an emission intensity upon printing at an intermediate part between two luminescent points while FIG. 17(b) shows an emission intensity upon printing at a luminescent point.

In each of these drawings, P,Q are luminescent points on a raster scanning line, $E_{th}$ the sensitivity of a photoconductor drum, and H the distance between the luminescent points. The solid curves indicate the luminescent intensities at the respective luminescent points P,Q, while the dashed curve shows a combined emission intensity.

In this case, compared with the emission intensity distributions shown in FIGS. 12(a) to 12(c), the breadth of the emission intensity distribution at each of the luminescent points P,Q is set narrower. Further, the maximum value of the emission intensity is set greater than the sensitivity $E_{th}$ of the photoconductor drum. In the combined emission intensity distribution, a valley is formed at an intermediate part between the luminescent points P and Q. The combined emission intensity at the intermediate part is higher than the sensitivity $E^{th}$ of the photoconductor drum so that printing is feasible there. Even if the combined emission intensity at the intermediate part between the luminescent points P and Q is lower than the sensitivity $E_{th}$ of the photoconductor drum, no problem arises in the quality of the resulting print as long as the width at the low emission intensity is so small that the width is not visible to the eye.

To make the breadth of the emission intensity distribution smaller as described above, it is necessary to use such light emitting diodes as enabling to make the individual luminescent points P,Q sufficient small compared with the distance H between the luminescent points and forming a valley at an intermediate part between the luminescent points P and Q in the combined emission intensity distribution, that is, at the center of prints. Further, an optical system of high resolution is used so that the adjacent two luminescent points P,Q can be sufficiently distinguished. Where the individual luminescent points P,Q are extremely small or the resolution of the optical system is extremely high, however, printed dots are connected upon printing and the resulting print has low quality.

In the case of an LED head 19 having the resolution of 300 DPI (FIG. 1), for example, it is therefore desired to set the size of the individual luminescent points at 48×48 ($\mu$m) and also to use "SLA20B" (trade name; rod lens array having high resolution MTF and manufactured by Nippon Sheet Glass Co., Ltd.) as an optical system for causing light, which have been emitted from light emitting diodes, to converge on a photoconductor drum. In this case, the breadth of the emission intensity distribution at each of the luminescent points P,Q is narrow so that the emission intensity has to be increased. It is however easy to make a print width $w_3$ at such a combined emission intensity as shown in FIG. 17(a) equal to a print width $w_4$ at the emission intensity at the luminescent point Q as shown in FIG. 17(b).

It is to be borne in mind that the present invention is not limited to the above embodiments and can be changed or modified in various ways on the basis of the principle or spirit of the present invention. Such changes and modifications shall not be excluded from the scope of the present invention. Specifically, the present invention is not limited to non-impact printers and may in fact be implemented in any type of printer.

We claim:

1. A method for performing printing by means of a non-impact printer equipped with an LED head and a conductor drum, the LED head having a resolution and a plurality of linearly arranged pixels, each of the pixels for emitting light, the conductor drum for receiving the emitted light and for registering the emission of the light on the conductor drum, the conductor drum having a sensitivity such that a first emission from a single pixel is registered on the conductor drum only if the single pixel emits at at least a first non-zero light energy, the first emission being registered on the conductor drum as a first-type dot, the sensitivity of the conductor drum also requiring that a second emission from a single pair of immediately adjacent pixels be registered on the conductor drum only if each of the pixels of the single pair emits at at least a second non-zero light energy less than the first energy, the second emission being registered as a second-type dot, the method comprising the steps of:

receiving a video signal having a resolution, the resolution of the video signal being as much as twice the resolution of the LED head, the video signal including a plurality of data lines, each of the data lines having a plurality of sequentially organized serial data bits;

determining whether both of a pair of adjacent bits have a logic for printing;

determining whether only one of the pair of adjacent bits has a logic for printing;

outputting a first data to a print head when both of the pair of adjacent bits have a logic for printing;

outputting a second data to the print head when only one of the pair of adjacent bits has a logic for printing;

driving the pixels of the LED head according to a basic line timing signal to perform printing of the first data along a basic raster scanning line, each of the driven pixels being caused to emit light at at least the first energy such that first-type dots are formed on the conductor drum; and driving the pixels of the LED head according to an additional line timing signal to perform printing of the second data along the basic raster scanning line, each of the driven pixels being caused to emit light at at least the second energy and less than the first energy such that second-type dots are formed on the conductor drum in instances where driven pixels are immediately adjacent other driven pixels.

2. A process for printing a supplied video signal, the video signal comprising a plurality of serial data bits, the process comprising the steps of:

inputting a pair of adjacent data bits from the plurality of serial data bits to a first logic gate and determining whether both of the adjacent bits have a logic for printing;

inputting the pair of adjacent bits to a second logic gate and determining whether only one of the adjacent bits has a logic for printing;

outputting a first data from the first gate to a print head when both of the adjacent bits have a logic for printing;

outputting a second data from the second gate to the print head when only one of the adjacent bits has a logic for printing;

printing the first data with the print head with a relatively large dot at a first printing area; and printing the second data with the print head with a smaller dot than the relatively large dot at a second printing area.

3. The process of claim 2 wherein the printing steps comprise:

printing the first data by applying a relatively large amount of electrical energy to a print head; and printing the second data by applying a smaller amount of electrical energy to the print head than the relatively large amount of electrical energy.

4. The process of claim 3 wherein the printing steps comprise:

printing the first data by applying a voltage to the print head for a relatively long period of time; and printing the second data by applying a voltage to the print head for a shorter period of time than the relatively long period of time.

5. A printer for printing a supplied video data signal, the video data signal comprising a plurality of serial data bits, the printer having a print head drivable at a first drive energy and a second drive energy smaller than the first drive energy, the printer comprising:

a doubled line timing signal generator producing a doubled line timing signal as an output, the doubled line timing signal for printing along the raster scanning line and along an additional raster scanning line by turns;

a first logic gate having inputs receiving a pair of adjacent data bits from the plurality of serial data bits, the first gate determining whether both of the adjacent bits have a logic for printing and outputting a signal indicative of the determination made by the first gate;

a second logic gate having inputs receiving the pair of adjacent bits, the second gate determining whether only one of the adjacent bits has a logic for printing and outputting a signal indicative of the determination made by the second gate;

a selector having inputs receiving the output signal of the first gate, the output signal of the second gate, and the doubled line timing signal, the selector alternately selecting each of the selector inputs based on the doubled line timing signal and producing the selected input as an output; and a controller having an input receiving the doubled line timing signal and the output of the selector, the controller driving the print head at the first drive energy in correspondence to the output of the first gate, and driving the print head at the second drive energy in correspondence to the output of the second gate, all in correspondence to the doubled line timing signal.

6. The printer of claim 5 further comprising:

a clock signal generator for producing a clock signal as an output;

a memory device connected at a first input to the output of the clock signal generator for receiving the clock signal, the memory device also being connected at a second input to the video data signal for receiving the plurality of serial data bits and for producing the pair of adjacent data bits according to the clock signal, the memory device also being connected at an output to the respective inputs of the first and second logic gates for communicating the pair of adjacent data bits thereto; and a divider connected at an input to the output of the clock signal generator for receiving the clock signal, the divider for halving the received clock signal and for producing the halved clock signal as an output;

the print head connected at an input to the output of the divider for receiving the halved clock signal, the halved clock signal for clocking the output of the selector to the print head.

7. The printer of claim 5 further comprising:

a line buffer connected between the output of the first gate and the corresponding input of the selector, the line buffer for delaying the receipt of the output of the first gate by the input of the selector.

8. The printer of claim 5 further comprising:

a line buffer connected between the output of the second gate and the corresponding input of the selector, the line buffer for delaying the receipt of the output of the second gate by the input of the selector.

9. The printer of claim 5 wherein the first gate is an AND gate and the second gate is an exclusive-OR gate.

10. The printer of claim 5 wherein the doubled line timing signal generator includes:

a line timing signal generator producing a line timing signal as an output, the line timing signal for printing along a raster scanning line; and a multiplier having an input receiving the line timing signal, the multiplier doubling the received line timing signal and producing the doubled line timing signal as an output.

\* \* \* \* \*